Aug. 18, 1925.
J. SENFT
1,550,578
REENFORCED CROSS CHAIN
Filed Sept. 26, 1922
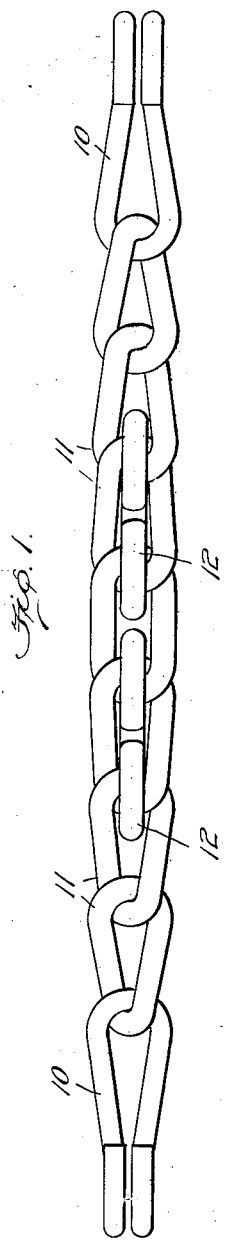
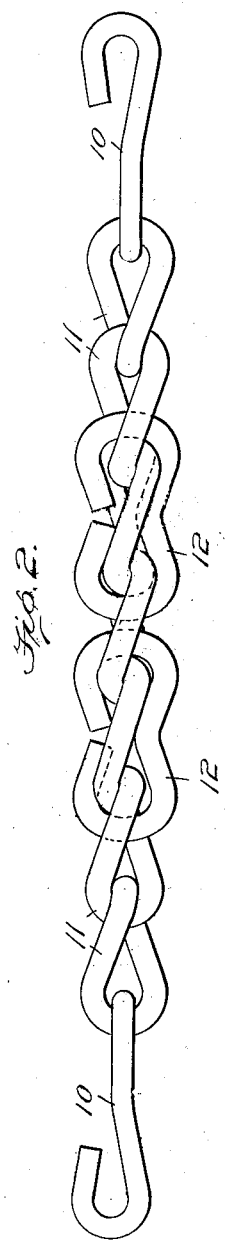
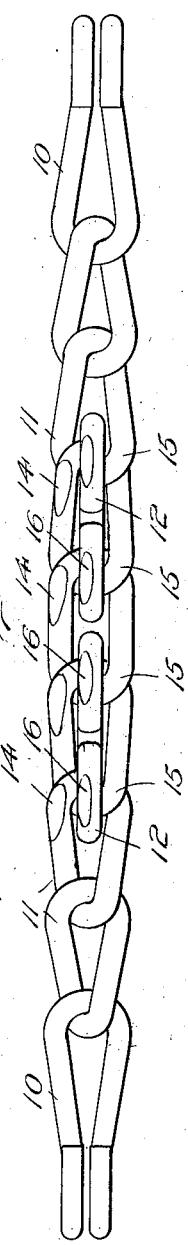
Inventor
John Senft
By Church & Church
His Attorneys Patented Aug. 18, 1925.

1,550,578

UNITED STATES PATENT OFFICE.

JOHN SENFT, OF YORK, PENNSYLVANIA, ASSIGNOR TO UNITED STATES CHAIN AND FORGING COMPANY, OF PITTSBURGH, PENNSYLVANIA, A CORPORATION OF PENNSYLVANIA.

REENFORCED CROSS CHAIN.

Application filed September 26, 1922. Serial No. 590,626.

*To all whom it may concern:*

Be it known that I, JOHN SENFT, a citizen of the United States, residing at York, in the county of York and State of Pennsylvania, have invented certain new and useful Improvements in Reenforced Cross Chains; and I do hereby declare the following to be a full, clear, and exact description of the same, reference being had to the accompanying drawings, forming part of this specification.

This invention relates to reenforced cross chains for automobile anti-skid or traction chain devices and particularly to reenforced cross chains having the reenforcements non-revolving.

The object of the present invention is to provide a reenforced cross chain of increased life and yielding additional traction. A further object of the invention is the provision of a stationary positioned reenforcing, whereby the cross chain may be reversed not only end for end, but which may be turned upside down on the tire and later again reversed end for end, thus distributing the wear on four distinct sides of the link.

A further object of the invention is the provision of non-revolving reenforcing members wherein each member connects a plurality of links so that if certain of the links of the cross chain should break or become worn out the reenforcing member would then serve as a chain link and prevent separation of the broken ends of the chain.

A further and valuable advantage of the present invention lies in the provision of high carbon steel non-revolving reenforcing members which may be inserted by the purchaser in cross chains of any of the common makes, the reenforcing links being of the "quick repair" type with parallel legs which are bent down to form a closed link after being inserted in the cross chain. It is the common practice in making cross chains to form the links of the cross chain of a relatively low carbon steel in order that they may be electrically welded. These links usually of the curb type can then be case hardened, but cannot be tempered, whereas, the reenforcing members not being welded may be made of such a high carbon steel as to take a fine temper and therefore acquire a very high degree of hardness.

In the drawings—

Figure 1 represents a plan view of a reenforced cross chain made in accordance with the present invention.

Fig. 2 is a side elevation.

Fig. 3 is a top view of a cross chain that has been worn by use but has not been turned or reversed so that all of the wear is shown on one of the four corners of the curb chain and at one side only of the reenforcing links.

In the drawings, the hooks or connecting members 10 and the curb chain links 11 are of the usual type, the hooks 10 being secured to the side chains (not shown) which are of such length as to form a circle slightly less in diameter than the greatest diameter of the inflated tire in order to prevent skidding. The links 11 are preferably curbed and for cheapness of manufacture are electrically welded.

Due to the necessity of using steel of such low carbon content as to be conveniently electrically welded it becomes quite difficult and expensive to give these links sufficient hardness to withstand the heavy duty imposed upon them in connection with city traffic or with the macadamized roads of highway importance. It would be possible to make the cross chains of high carbon steel without welding the links but in practice this presents disadvantages which more than compensate for the additional hardness and it has therefore been deemed requisite and necessary that the two connecting members 10 must be joined by a complete series of welded links.

The reenforcing members 12 are here shown as links, each embracing one curb link and also connecting the proximate ends of each two adjacent curb links.

In their preferred structure, the links 12 are of the quick detachable type shown in the patent to Frank A. Bond No. 1,411,836, dated April 4, 1922, this type permitting easy construction of the reenforced chain by the purchaser of the links. The links 12 are preferably not welded, it being my desire to make these links of high carbon steel so that they will be of much greater hardness than the case hardened electrically welded curb links. As shown in the various figures the links 12 are not free to revolve or rotate about the ends of the connecting links and are of such length as to clear each other when the chain is extended thus avoiding the friction between the reenforcing members themselves.

In practice the cross chains are used without reversing until a corner such as 14 of the curb chain links begins to show appreciable wear. It is then the plan to reverse the cross chains end for end so that the opposite corner 15 may now take the wear. This reversing of the chain end for end will also reverse the wear on the reenforcing members 12. As will be seen from Fig. 3 the side 16 of the link 12 is worn to some extent in the first position but in the second position the bevel of wear will be on the opposite side of the links and when the cross chain is turned upside down, first one side of the links will be given an additional wear and then when turned end for end the other side will be given additional wear, the links being made of such size that when worn on their two sides they will still have sufficient body to allow for wear during the third and fourth reversal of the chain, in other words the links are preferably of such cross section and hardness as to outwear the curb links.

What I claim is:

1. In a tire chain, the combination with a plurality of connected links of a plurality of additional links each non-rotatably inserted in the chain with their greatest dimensions transversely disposed with respect to the line of travel of the vehicle so as to contact with the roadway and thereby relieve the connected links of a portion of the wear.

2. The chain of claim 1 characterized by the additional links being non-welded, each of said additional links being connected at its ends to two longitudinally spaced links of the connected links.

3. The chain of claim 1 characterized by the additional links being disposed longitudinally of the chain each with its two ends facing each other.

4. The chain of claim 1 characterized by the connected links being welded and the additional links being non-welded and being disposed longitudinally of the chain each with its two ends facing each other.

5. In a tire chain, the combination with a plurality of connected links of a plurality of additional links each non-rotatably inserted in the chain so as to contact with the roadway and thereby relieve the connected links of a portion of the wear, characterized by each additional link joining together two non-consecutive connected links.

6. The chain of claim 1 characterized by the connected links being welded and the additional links being non-welded, said additional links joining together two non-consecutive connected links.

JOHN SENFT.